(12) United States Patent
Rudnicki (10) Patent No.: US 10,478,922 B2
(45) Date of Patent: Nov. 19, 2019

(54) WIRE-BASED ADDITIVE MANUFACTURING SYSTEM AND METHOD

(71) Applicant: GM Global Technology Operations LLC, Detroit, MI (US)

(72) Inventor: Mark Francis Rudnicki, Royal Oak, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 442 days.

(21) Appl. No.: 15/483,376

(22) Filed: Apr. 10, 2017

(65) Prior Publication Data

US 2018/0290240 A1 Oct. 11, 2018

(51) Int. Cl.

| | |
|---|---|
| *B23K 26/342* | (2014.01) |
| *B23K 26/38* | (2014.01) |
| *B33Y 30/00* | (2015.01) |
| *B23K 26/242* | (2014.01) |
| *B23K 26/06* | (2014.01) |
| *B23K 26/08* | (2014.01) |
| *B23K 35/02* | (2006.01) |
| *B23K 101/22* | (2006.01) |

(52) U.S. Cl.
CPC ........ *B23K 26/342* (2015.10); *B23K 26/0604* (2013.01); *B23K 26/0846* (2013.01); *B23K 26/242* (2015.10); *B23K 26/38* (2013.01); *B23K 35/0277* (2013.01); *B33Y 30/00* (2014.12); *B23K 2101/22* (2018.08)

(58) Field of Classification Search
CPC .. B23K 26/342; B23K 26/0604; B23K 26/38; B23K 26/0846; B23K 26/242; B23K 35/0277
See application file for complete search history.

(56) References Cited

U.S. PATENT DOCUMENTS

| | | | | |
|---|---|---|---|---|
| 6,658,818 | B2* | 12/2003 | Kurth | B23K 26/0846 53/426 |
| 2009/0152249 | A1* | 6/2009 | Petro | B23K 26/0846 219/121.64 |
| 2015/0165554 | A1* | 6/2015 | Voice | B23K 26/1476 219/74 |
| 2016/0089754 | A1* | 3/2016 | Luo | B23K 26/342 29/889.7 |
| 2016/0090842 | A1* | 3/2016 | Luo | F01D 5/147 416/232 |
| 2016/0175984 | A1* | 6/2016 | Dalle Donne | B23K 9/044 219/76.12 |

\* cited by examiner

*Primary Examiner* — Geoffrey S Evans (57) ABSTRACT

A wire based additive manufacturing system includes a base movable in a feed direction. Multiple welding lasers are each spatially fixed as the base moves in the feed direction. Multiple cutting lasers are each spatially fixed as the base moves in the feed direction. Multiple wire feed members each feed an individual wire of a plurality of wires onto the base as the base moves in the feed direction. Each one the multiple welding lasers is energized to fuse parallel adjoining ones of the plurality of wires, and each one of the cutting lasers is energized to cut one of the fused wires to complete one of a plurality of wire layers.

20 Claims, 9 Drawing Sheets

WIRE-BASED ADDITIVE MANUFACTURING SYSTEM AND METHOD

INTRODUCTION

The present disclosure relates to additive manufacturing machines and processes.

Additive manufacturing of lattice structure metal parts can be presently performed using laser sintering of a powdered metal which locally melts the powdered metal and fuses the melt to a base material or to a lower level of previously fused metal. A new layer of the powdered metal is then applied and the laser sintering process is repeated. In this way multiple additive layers of metal are laser fused in successive steps until a finished part thickness or depth is achieved. Multiple parts can be manufactured at the same time, and the parts can have complex geometries.

Drawbacks of present laser sintering processes include undesired welding of the powdered metal, the over-application of the powdered metal onto areas which do not require welding, which induces waste of the unused powdered metal, or requires a reclamation process to collect, refine and reuse the powdered metal. This process is also slowed by the powdered metal installation procedure in between each welding step, plus any cleaning or smoothing of the previous layer of welded material required before a next layer can be applied. The laser must also directly contact the entire surface area of the part being manufactured to melt the powdered metal, and the process is therefore is limited in speed to the speed of motion of the welding laser.

Thus, while current laser sintering additive manufacturing processes achieve their intended purpose, there is a need for a new and improved system and method for additive manufacturing of metal or plastic parts.

SUMMARY

According to several aspects, a wire based additive manufacturing system includes: a base movable in a feed direction; at least one welding laser; and at least a first and a second cutting lasers. At least a first wire feed member feeds a first wire onto the base as the base moves in the feed direction. At least a second wire feed member feeds a second wire onto the base and parallel to the first wire as the base moves in the feed direction. The at least one welding laser is energized to fuse the first wire to the second wire, the first cutting laser is energized to cut the first wire and the second cutting laser is energized to cut the second wire to complete a wire layer.

In another aspect of the present disclosure, after the first and the second wires are fused together to complete the wire layer and each is cut the base is lowered and rotated approximately 90 degrees to position the base to receive a next wire from the first wire feed member and a next wire from the second wire feed member to create a next wire layer above the wire layer.

In another aspect of the present disclosure, the next wire from the first wire feed member and the next wire from the second wire feed member are oriented orthogonally to the first wire and the second wire.

In another aspect of the present disclosure, a wire guide slidably receives each of the first wire and the second wire and is oriented to direct the first wire and the second wire toward the at least one welding laser.

In another aspect of the present disclosure, the wire guide is spatially fixed as the base moves in the feed direction.

In another aspect of the present disclosure, a plurality of flexible depressor fingers extend from the wire guide acting to bias the first wire and the second wire toward the base.

In another aspect of the present disclosure, the at least one welding laser and the at least first and second cutting lasers are spatially fixed as the base moves in the feed direction.

In another aspect of the present disclosure, a first mirror redirects a laser welding beam from the at least one welding laser to the first wire and the second wire; and a second mirror redirects a laser cutting beam from each of the at least first and second cutting lasers to one of the first wire or the second wire.

In another aspect of the present disclosure, each of the first wire and the second wire define a trapezoidal-shape having opposed angular faces, an angular face of the first wire and an angular face of the second wire facing each other to define an intersection between the first wire and the second wire permitting a fillet weld to be created at the intersection using the at least one welding laser.

In another aspect of the present disclosure, a wire guide has multiple apertures each defining a trapezoidal-shape and are sized to slidably receive one of the first wire or the second wire. Each of the multiple apertures communicates with a slot created in the wire guide and is oriented to direct one of the first wire and the second wire toward the at least one welding laser.

According to several aspects, a wire based additive manufacturing system includes a base movable in a feed direction. Multiple welding lasers are each spatially fixed as the base moves in the feed direction. Multiple cutting lasers are each spatially fixed as the base moves in the feed direction. Multiple wire feed members each feed an individual wire of a plurality of wires onto the base as the base moves in the feed direction. Each one the multiple welding lasers is energized to fuse parallel adjoining ones of the plurality of wires, and each one of the cutting lasers is energized to cut one of the fused wires to complete one of a plurality of wire layers.

In another aspect of the present disclosure, each of the multiple wire feed members include: a stepper motor; and a guide roller.

In another aspect of the present disclosure, each stepper motor is operated at a feed rate less than a rate of displacement of the base in the feed direction to create a reverse tension force in the plurality of wires.

In another aspect of the present disclosure, successive ones of the stepper motors are staggered in height above a surface of the base.

In another aspect of the present disclosure, the multiple welding lasers and the multiple cutting lasers are coupled to define a laser welding assembly.

In another aspect of the present disclosure, each of the plurality of wires define a trapezoidal-shape having opposed angular faces, an angular face of individual parallel adjoining ones of the plurality of wires creating a longitudinal channel across each wire layer.

In another aspect of the present disclosure, a gap is created in the one of the plurality of wires by operation of one of the multiple cutting lasers on one of the plurality of wires as the base continues to displace in the feed direction.

According to several aspects, a method for operating a wire based additive manufacturing system includes: moving a base in a feed direction; spatially fixing multiple welding lasers and multiple cutting lasers as a welding assembly with respect to the base as the base moves in the feed direction; operating multiple wire feed members to feed individual wires of a plurality of wires onto the base as the base moves in the feed direction; energizing each one the multiple welding lasers to fuse parallel adjoining ones of the plurality of wires; and energizing each one of the cutting lasers to cut one of the fused wires to complete one of a plurality of wire layers.

In another aspect of the present disclosure the method includes after each of the parallel adjoining ones of the plurality of wires are fused together and each of the plurality of wires is cut to complete one of the plurality of wire layers: lowering the base; and rotating the base, for example approximately 90 degrees, to position the base to receive a next wire from each of the multiple wire feed members to create a next wire layer above the one of the plurality of wire layers.

In another aspect of the present disclosure the method includes creating at least one vertical column connecting two of the plurality of wire layers.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
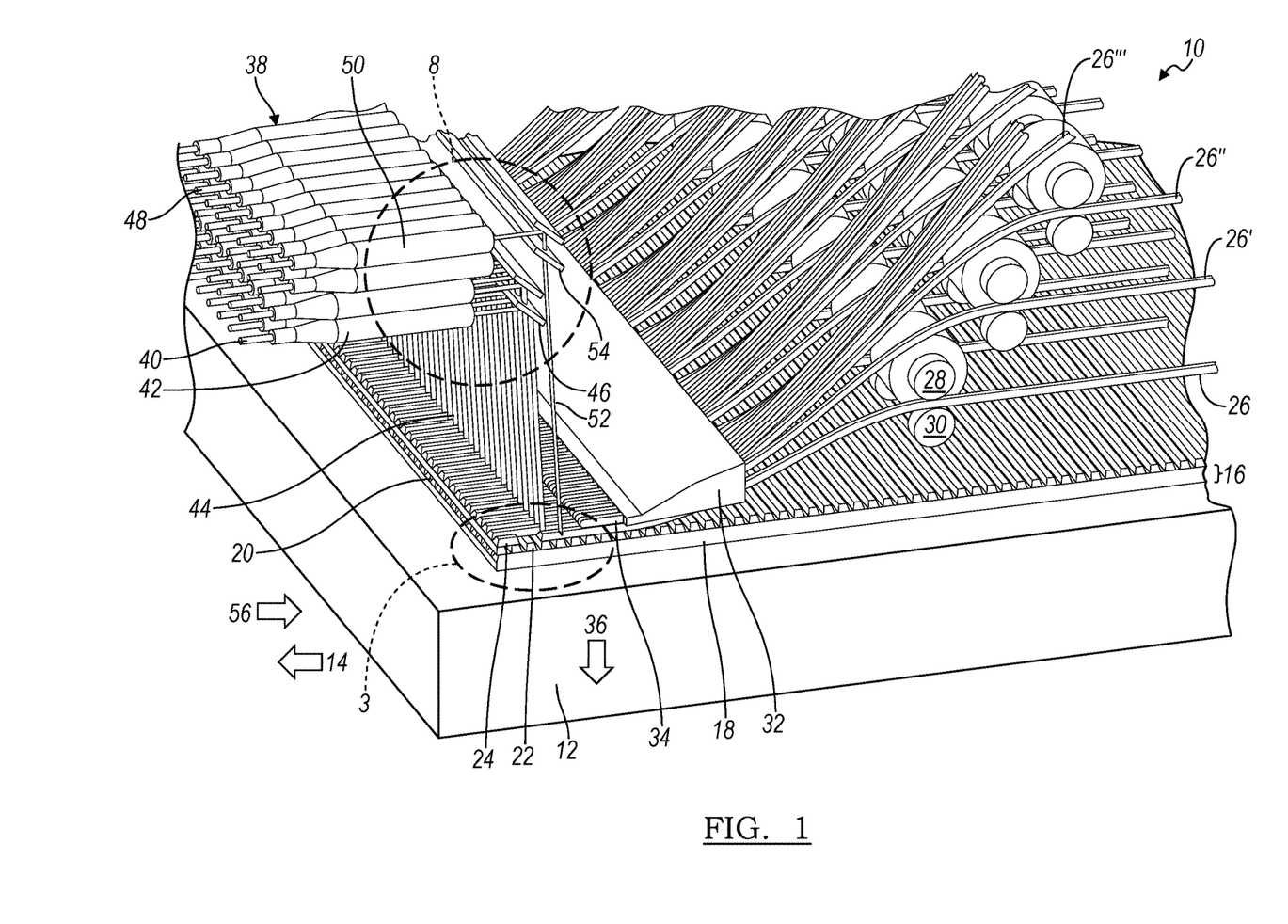
FIG. 1 is a front left perspective view of a wire based additive manufacturing system according to an exemplary embodiment.

Referring to FIG. 1, a wire based additive manufacturing process and method, hereinafter wire based additive manufacturing system 10 includes a platform or base 12 which is presented in a planar form, however the base 12 can take on different geometric forms from that shown, including curved. The base 12 is displaced in a feed direction 14 during welding of a wire additive member 16. The wire additive member 16 includes at least one and according to several aspects multiple layers of wire material, with each layer having wires oriented substantially transverse to the layer below it.

In the example presented, the wire additive member 16 includes a first layer 18 which can be a sheet of material such as a metal upon which multiple wires can be welded to each other and supported by the first layer 18. According to several aspects the first layer 18 may be sacrificed such that the first layer 18 is removed after formation of the above layers. The first layer 18 may include a pattern of slots or grooves 20 to minimize welding contact as the wires of successive layers are applied. A second layer 22 provides multiple wires oriented parallel to each other, with each of the wires of the second layer 22 welded to an adjoining one of the wires of the second layer 22. A third layer 24 represents how a next or each new layer is created. The third layer 24 includes multiple wires such as wires 26, 26', 26", 26''' each oriented parallel to each other, each angularly oriented with respect to the wires of the second layer 22, with each of the wires 26, 26', 26", 26''' of the third layer 24 ready to be welded to a successive one of the wires of the second layer 22 (such as the wire 26' being welded to each of the wire 26 and the wire 26").

Each of the wires such as the wire 26 are individually fed from a wire spool (not shown) using a stepper motor 28 and a guide roller 30. According to several aspects, a size of the wires 26 can have a cross section of approximately 1.0 mm, however the wire size can vary within the scope of the present disclosure. Each of the wires 26 is fed into and through a wire guide 32 which sets the parallel orientation of the wires being fed onto the base 12. A plurality of flexible depressor fingers 34 are fixed to the wire guide 32 and act to depress the wires 26 in a downward direction 36 as they exit the wire guide 32 so that the wires 26 are pressed into physical contact with the wires of the next lower layer of the wire additive member 16. The depressor fingers 34 are flexible to maintain a downward compressive force on the wires 26 toward the base 12 until they can be welded using a laser welding assembly 38.

The laser welding assembly 38 includes both welding and cutting lasers as follows. Each of a plurality of welding laser optical feeds 40 such as a fiber optic feed are connected to a welding collimator lens 42. A laser welding beam 44 is redirected out of each of the collimator lenses 42 using at least one reflective mirror 46 to orient the laser welding beams 44 in the downward direction 36. Each of the laser welding beams 44 are oriented substantially perpendicular to the orientation of the wires 26, 26', 26", 26''', and individual ones of the laser welding beams 44 are positioned between two successive ones of the wires, such as for example between wires 26, 26'.

Similar to the welding lasers, each of a plurality of cutting laser optical feeds 48 such as a fiber optic feed are connected to a cutting collimator lens 50. A laser cutting beam 52 is redirected out of each of the collimator lenses 50 using at least one reflective mirror 54 to orient the laser cutting beams 52 in the downward direction 36. Each of the laser cutting beams 52 are also oriented substantially perpendicular to the orientation of the wires 26, 26', 26", 26''', and individual ones of the laser cutting beams 52 are positioned to directly intersect one of the wires, such as for example wire 26 shown.

According to several aspects, the laser welding assembly 38 including both the welding lasers 42 and the cutting lasers 50 can be laterally fixed, or can be displaced laterally, in a direction perpendicular to the feed direction 14. Lateral movement may be used to accommodate different welding or cutting beam widths of the individual lasers. Lateral movement may be for example approximately one-half of a width of the wire 26. Lateral movement also allows melt of only one side of one of the wires 26 at a time, which will minimize melt of underlying wire material from a lower layer. The need for lateral cutting laser movement may be obviated if a beam shape of the cutting laser is oval in lieu of circular, having a width to match a width of the wire being cut.

The stepper motors 28, the guide rollers 30, the wire guide 32, the depressor fingers 34, and each of the components of the laser welding assembly 38 (except when the lateral movement discussed above is desired) are fixed in position and do not displace as the base 12 and the wire additive member 16 displace in the feed direction 14 during welding and cutting of the wires of the wire additive member 16. This ensures that the wires for each layer of the wire additive member 16 are similarly oriented and held in position by the depressor fingers 34, welded, and cut as necessary. This also ensures that the orientation of each of the mirrors 46, 54, the laser welding beams 44, and the laser cutting beams 52 remain fixed in relation to the wire positions.

To ready the system for a next successive layer of the wire additive member 16, each of the wires is cut using one of the laser cutting beams 52 to define an end or edge of the wire additive member 16, the base 12 is returned in a return direction 56 opposite to the feed direction 14, and is rotated at an angle ranging between approximately 45 degrees to 90 degrees from the orientation shown. The stepper motors 28 are then operated to feed wires for a next successive layer of the wire additive member 16 as the base 12 is again displaced in the feed direction 14.

Referring to FIG. 2 and again to FIG. 1, to account for an increasing thickness of the wire additive member 16, as each successive layer is added, a surface 58 of the base 12 is incrementally lowered in the downward direction 36 by an amount equal to a thickness of the wires 26. This maintains a constant downward pressure from the depressor fingers 34 on the wires 26. To minimize a bend radius 59 of the wires such as the wires 26, 26' that is required for the wires to be fed into the wire guide 32 from the stepper motors, successive ones of the stepper motors, such as the stepper motors 28, 28' shown are staggered in height above the surface 58 and may also be staggered laterally as shown. To minimize the chance of a wire bending during feed into the wire guide 32, the stepper motors 28 can be operated at a feed rate slightly less than the rate of displacement of the base 12 in the feed direction 14 to create a small reverse tension force acting on the wires in a direction 60.

Figure 2:
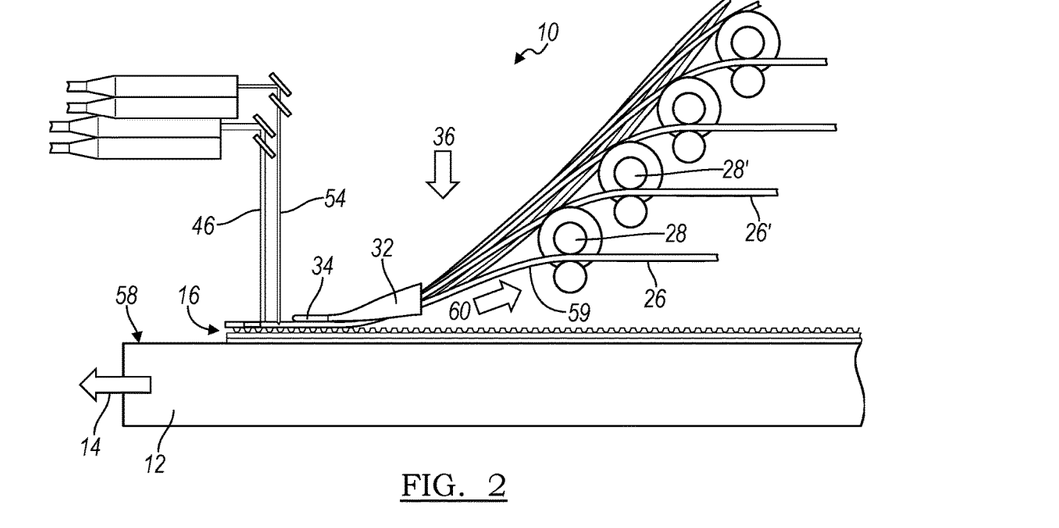
FIG. 2 is a front elevational view of the wire based additive manufacturing system of FIG. 1.

Referring to FIG. 3 and again to FIGS. 1 and 2, as previously noted the successive wire layers of the wire additive member 16 have the wires angularly oriented such as being oriented perpendicular to each other. To reduce a weight of the wire additive member 16 each of the wires is provided with a trapezoidal-shaped cross section such that adjoining ones of the wires create longitudinal channels through the layer such as channels 62, 62'. As the laser welding beam 44 passes between adjoining wires a fillet weld pool 64 fixes the adjoining wires to each other, and a root weld 66 fixes the two adjoining wires of one of the layers, such as from the second layer 22 to the wires of a next lower layer.

Figure 3:
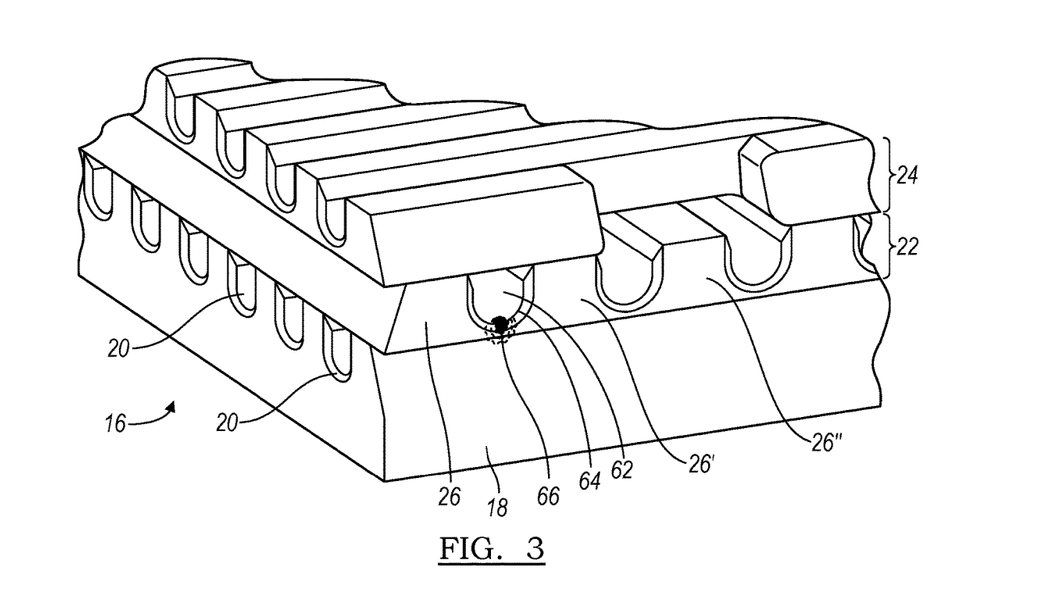
FIG. 3 is a front left perspective view of area 3 of FIG. 1.

Referring to FIG. 4 and again to FIG. 3, multiple adjoining wires such as adjoining wires 26 and 26', adjoining wires 26' and 26", and adjoining wires 26" and 26'" are simultaneously welded using individual welding lasers such as laser welding beams 44, 44', 44". A fillet weld pool 64 as previously described fuses each pair of adjoining wires to each other for a desired length of the wires in the wire additive member 16. If it is desired to provide one or more individual wires with a length less than a total length of the wire additive member 16, one of the laser cutting beams 52 can be applied at each desired cutting position to cut an individual one of the wires such as wire 26 into a first wire portion 68 and a second wire portion 70. The depressor fingers 34 are positioned proximate to the welding and cutting positions to retain the wires in their parallel arrangement prior to welding or cutting.

Figure 4:
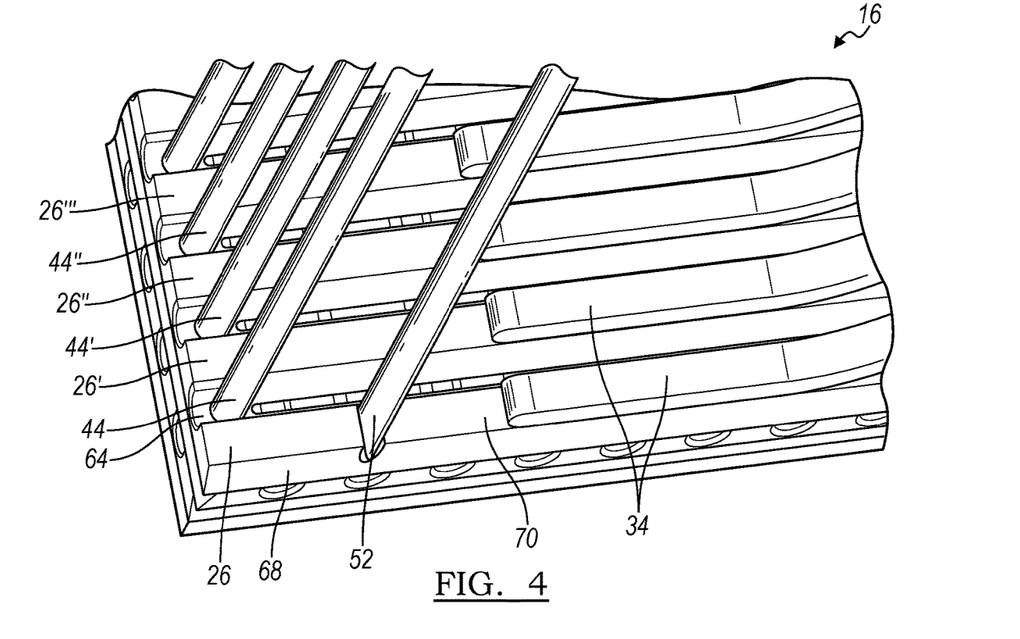
FIG. 4 is a front left perspective view similar to FIG. 3 showing laser welding and laser cutting being performed.
Figure 5:
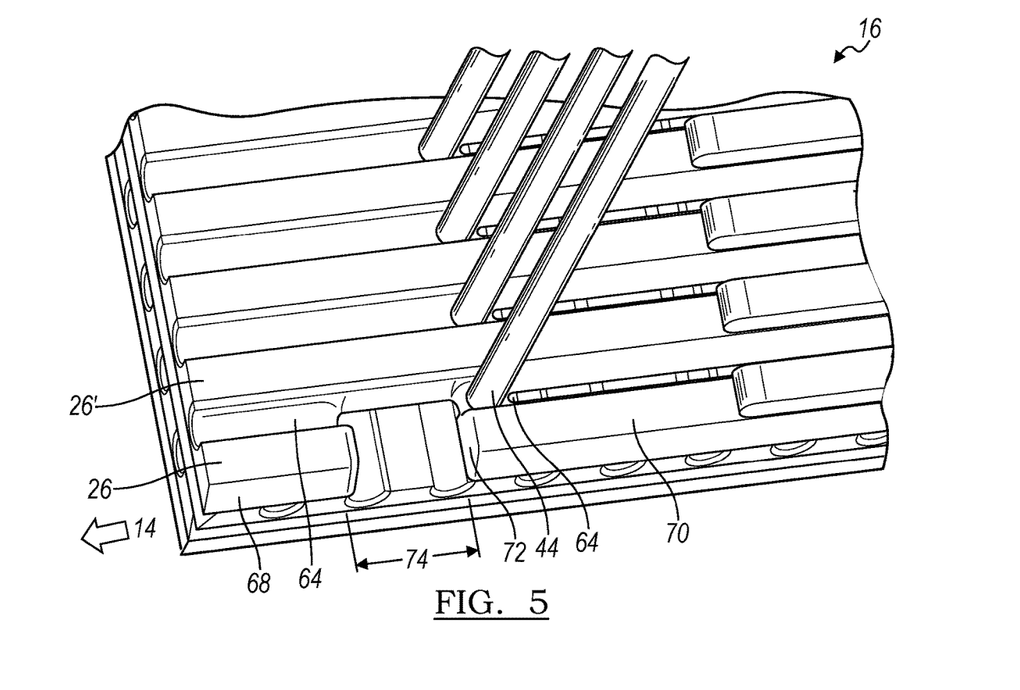
FIG. 5 is a front left perspective view modified from FIG. 4 following the laser cutting operation.

Referring to FIG. 5 and again to FIG. 4, a gap 72 is created using the laser cutting beam 52 (shown in FIG. 4) for a time period as the wire additive member 16 continues to displace in the feed direction 14. A width 74 of the gap 72 is dependent on the amount of time of operation of the laser cutting beam 52 multiplied by the speed or rate of displacement of the wire additive member 16 with the base 12. The laser welding beams 44 can be selectively stopped during operation of the laser cutting beam 52 such that the fillet weld pool 64 is omitted within the gap 72.

Referring to FIG. 6 and again to FIG. 3, according to several aspects the trapezoidal-shape of the wires such as wire 26' provides a base surface 76, a top 78 parallel to the base surface 76, a first angular side face 80 and a second angular side face 82. According to several aspects the first and second angular side faces 80, 82 are substantially flat or planar. As the wires are fed through the wire guide 32 the first angular side face 80 is positioned adjacent to an angular side face 84 of an adjoining wire such as wire 26 to form an intersection 86. The trapezoidal-shaped wires advantageously allow the laser welding beam 44 to be positioned between the first angular side face 80 and the angular side face 84, directed at the intersection 86, and oriented perpendicular to the base surface 76. This allows a single fillet weld and the fillet weld pool 64 to be equally divided between the adjoining wires 26, 26', and permits creation of the root weld 66 into the next lower wire such as a wire 88 of the first layer 18 shown.

Figure 6:
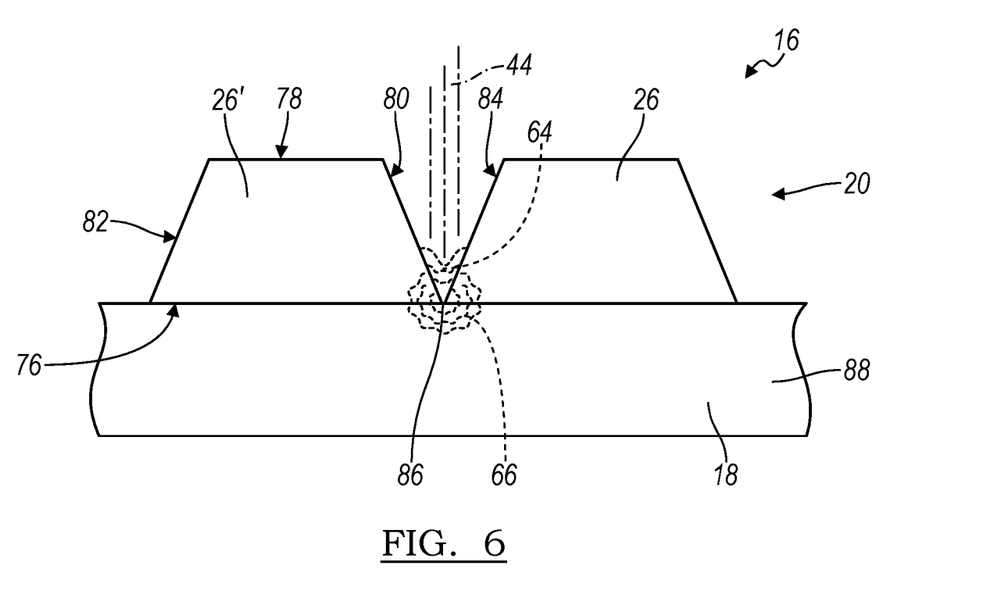
FIG. 6 is an end elevational view of a wire additive member made using the wire based additive manufacturing system of FIG. 1.
Figure 7:
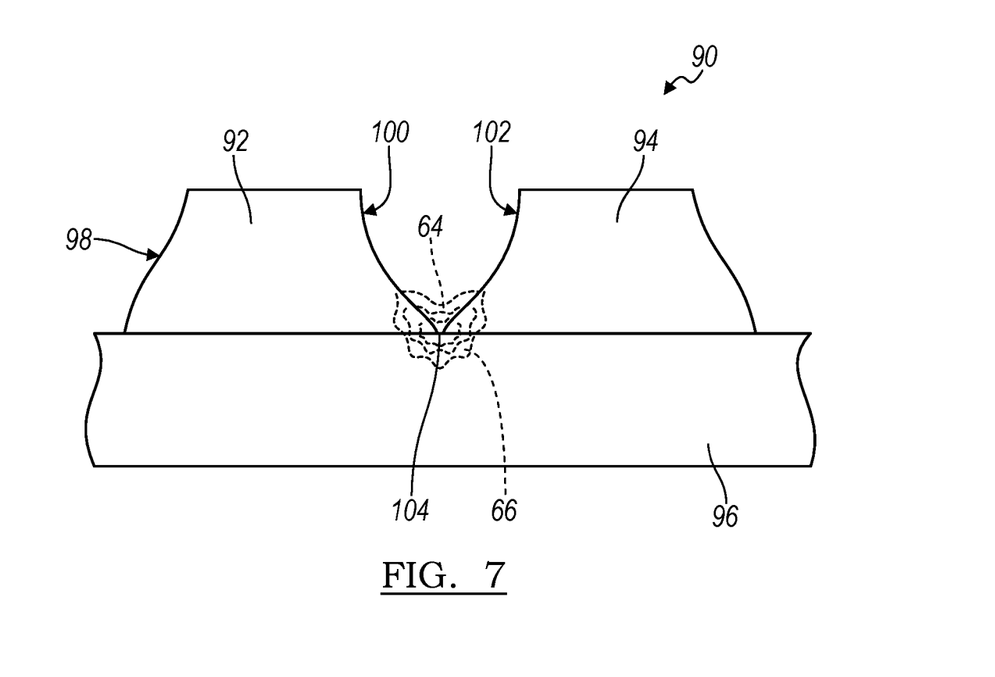
FIG. 7 is an end elevational view modified from FIG. 6.

Referring to FIG. 7 and again to FIG. 6, according to several aspects a wire additive member 90 can be modified from the wire additive member 16 to change the trapezoidal-shape of the wires. In this example the wire additive member 90 includes at least two wire layers including a first wire 92 oriented parallel to a second wire 94, with both the first wire 92 and the second wire 94 oriented orthogonally to a wire 96 of a lower wire layer. Each of the wires include oppositely directed concave-shaped faces such as a first concave-shaped face 98 and a second concave-shaped face 100. The second concave-shaped face 100 is positioned facing a concave-shaped face 102 of the second wire 94, creating an intersection 104 similar to the intersection 86. Again, this allows a single fillet weld and the fillet weld pool 64 to be equally divided between the adjoining wires 92, 94, and permits creation of the root weld 66 into the next lower wire such as the wire 96.

Figure 8:
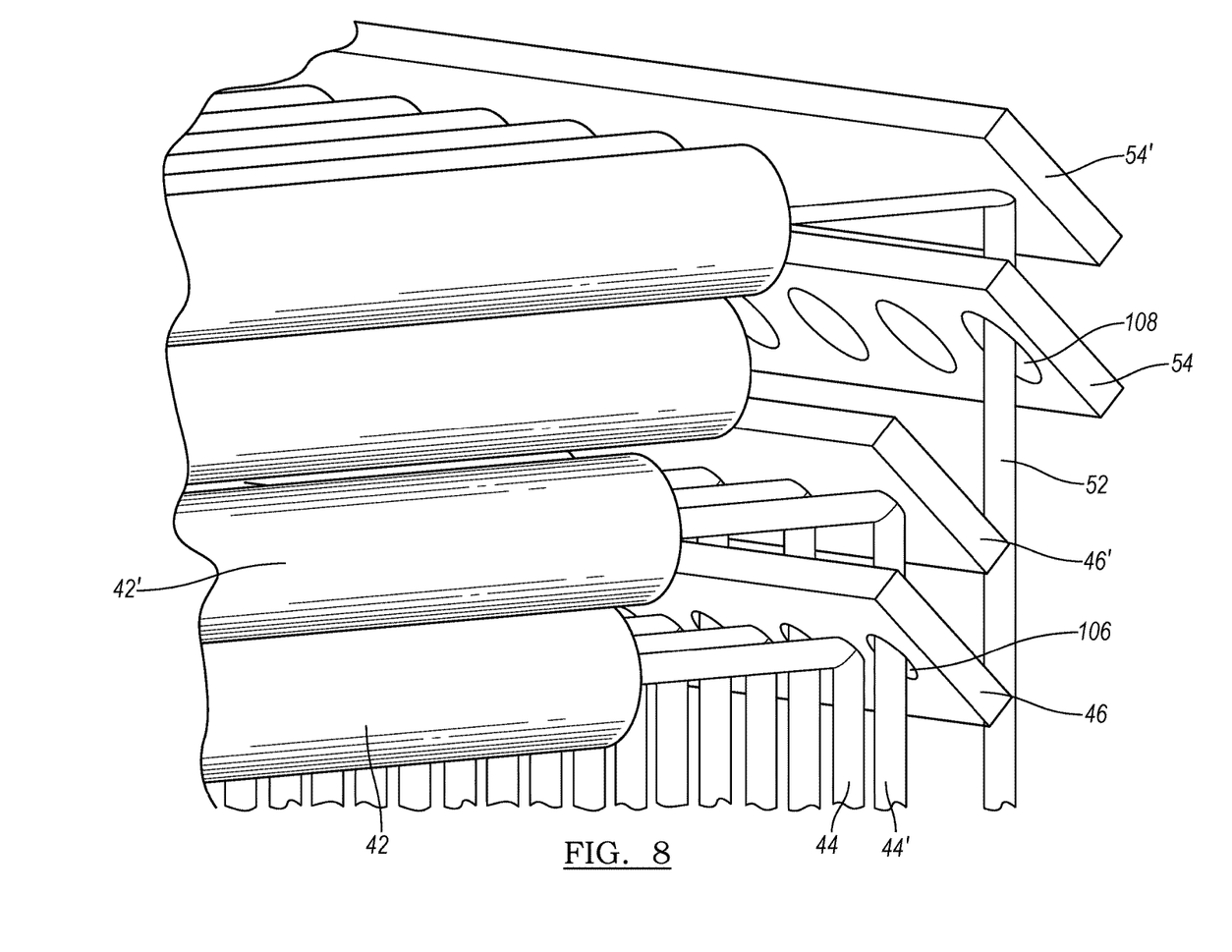
FIG. 8 is a front left perspective view of area 8 of FIG. 1.

Referring to FIG. 8 and again to FIG. 1, depending on the spacing between wires in each of the wire layers, to provide sufficient space for the multiple different welding collimator lenses 42 and the cutting collimator lenses 50 multiple mirrors may be used. For example, the at least one reflective mirror 46 can include a first reflective mirror 46 and a second reflective mirror 46' used for the laser welding beams 44. To provide space for the individual laser welding beams 44, apertures can be provided in the first reflective mirror 46, including at least one aperture 106 which provides clearance for transmission of a laser welding beam 44'. Similarly, the at least one reflective mirror 54 can include a first reflective mirror 54 and a second reflective mirror 54' used for the laser cutting beams 52. To provide space for the individual laser cutting beams 52, apertures can be provided in the first reflective mirror 54, including at least one aperture 108 which provides clearance for transmission of the laser cutting beam 52.

Referring to FIG. 9 and again to FIG. 1, the wire guide 32 includes a face 110 having multiple apertures 112 each having a trapezoidal-shape similar to the trapezoidal-shape of the wires 26. To allow spacing for the wires 26, the stepper motors 28 and the guide rollers 30, the apertures 112 may be staggered, for example forming a wave-pattern as shown. The wave-pattern allows adjacent apertures such as apertures 112', 112" to be positioned at differing elevations on the face 110.

Figure 9:
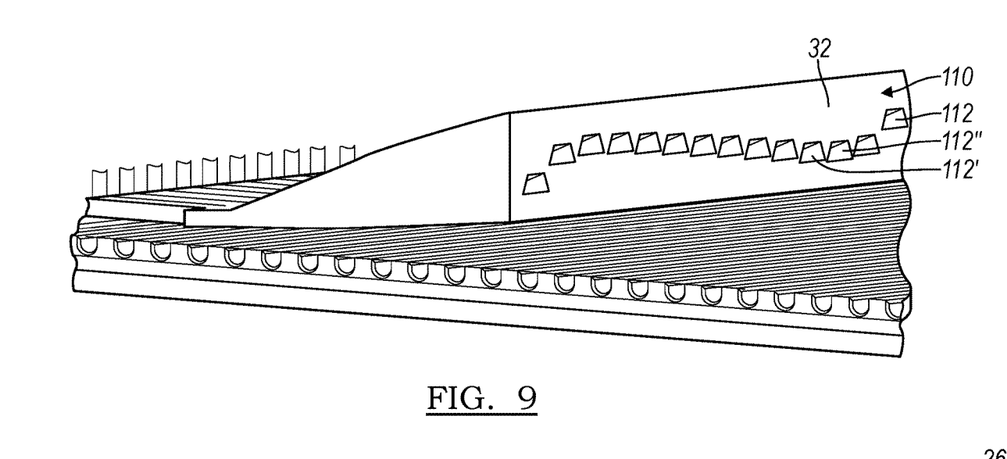
FIG. 9 is a rear left perspective view of a wire guide of FIG. 1.
Figure 10:
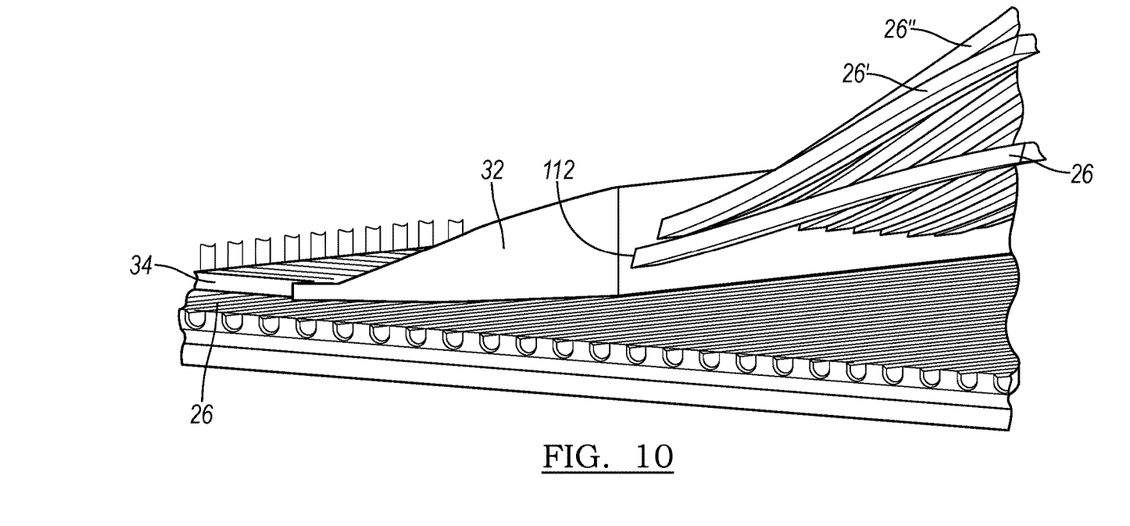
FIG. 10 is a rear left perspective view modified from FIG. 9 to further include wires.

Referring to FIG. 10 and again to FIG. 9, the wave-pattern of the apertures 112 allows the wires such as wires 26, 26', 26" to stagger and not overlap in proximity to the wire guide 32. As each wire passes out of the wire guide 32, it directly contacts and is guided by one of the depressor fingers 34.

Figure 11:
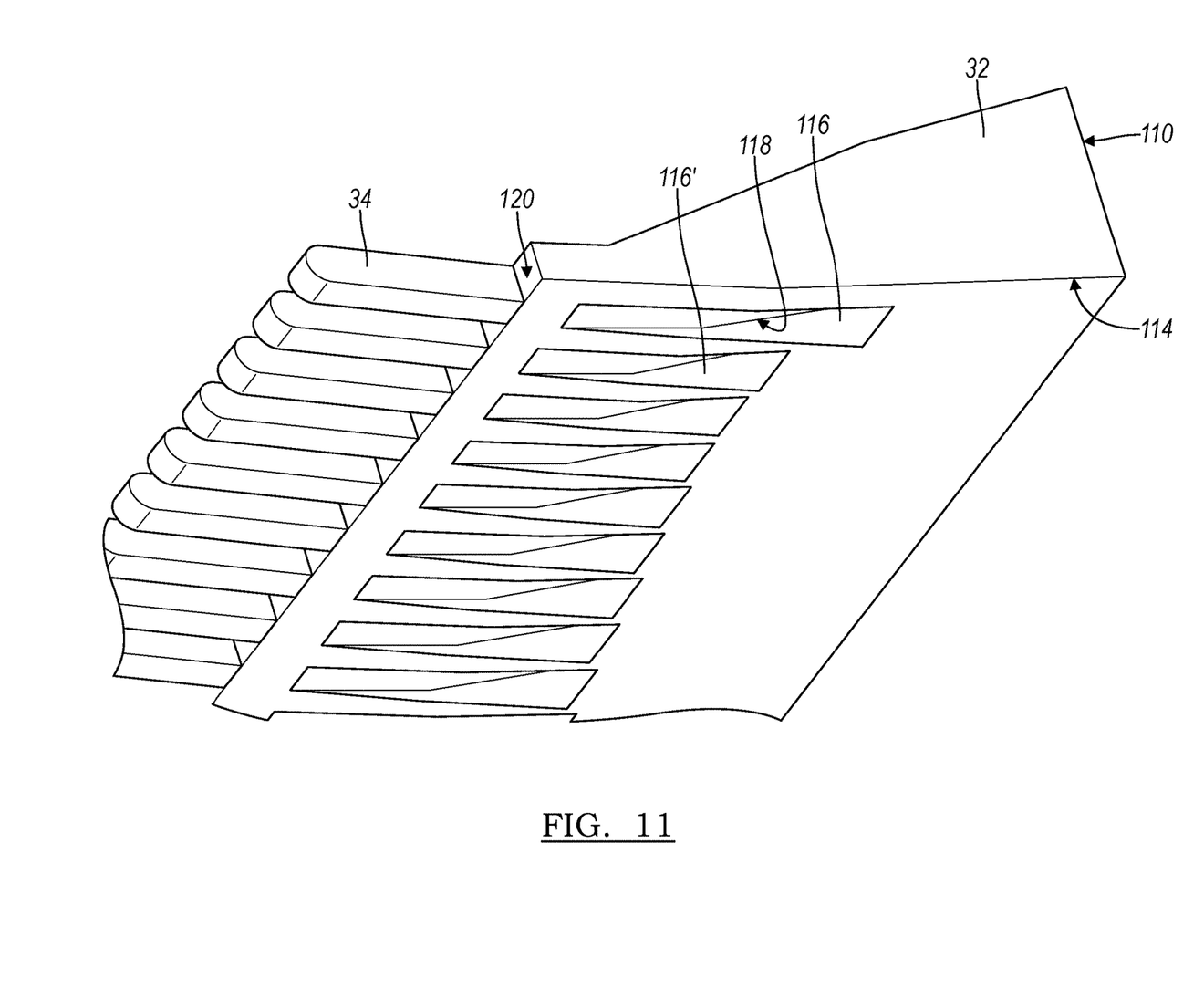
FIG. 11 is a bottom left perspective view of the wire guide of FIG. 9.

Referring to FIG. 11, a bottom surface 114 of the wire guide 32 provides multiple longitudinal slots 116 sized to slidably guide the individual wires 26. Each slot 116 communicates with one of the apertures 112. Each slot 116 provides a tapered surface 118 to downwardly push the wire 26 toward the bottom surface 114. The slots 116 can form a wave-like pattern similar to the wave-pattern of the apertures 116, and can have different lengths, such as a slot 116' which is shorter than the slot 116 shown. The depressor fingers 34 are integrally connected to an end face 120 of the wire guide 32. The depressor fingers 34 can be formed as homogeneous extensions of the wire guide 32, or can be separately but fixedly attached to the end face 120.

Figure 12:
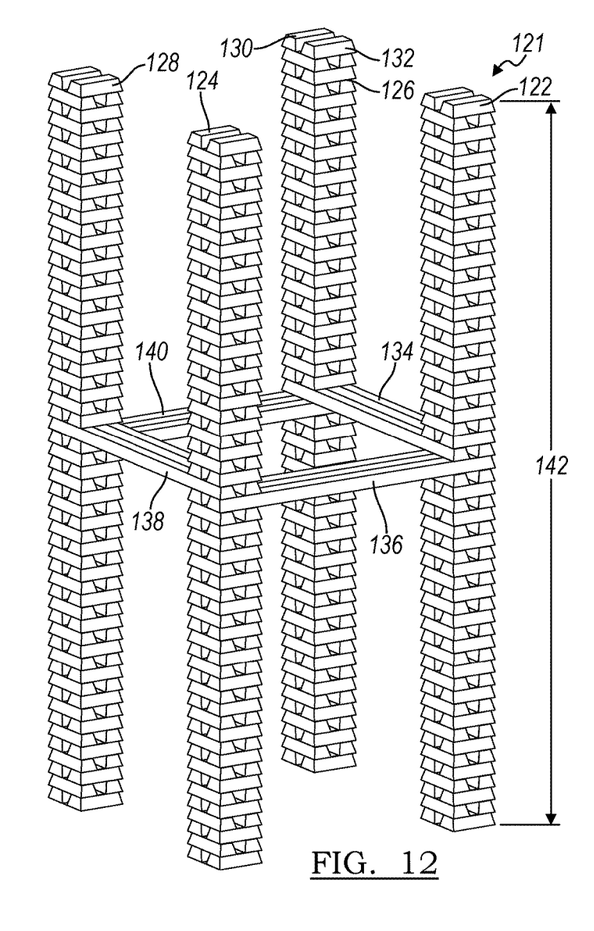
FIG. 12 is a front perspective view of an exemplary structure manufactured using the wire based additive manufacturing system of FIG. 1.

Referring to FIG. 12, a structure 121 having multiple vertical columns 122, 124, 126, 128 can be formed using the wire based additive manufacturing system 10 of the present disclosure. These columns can be used as separate portions of an object manufactured by the process, or can also be used in an interim manufacturing step to support members or portions of an object that may have a central core with wings or features that extend outwardly from the core. Such items for example may include members having a central core and outwardly extending or overhanging portions, or members having multiple holes or pores. The vertical columns 122, 124, 126, 128 can be used to individually support each of the layers forming the blades as the blades and the core are welded. Intermediate cross-support members 134, 136, 138, 140 can be used depending a total height 142 of the structure to provide stiffness as necessary.

Figure 13:
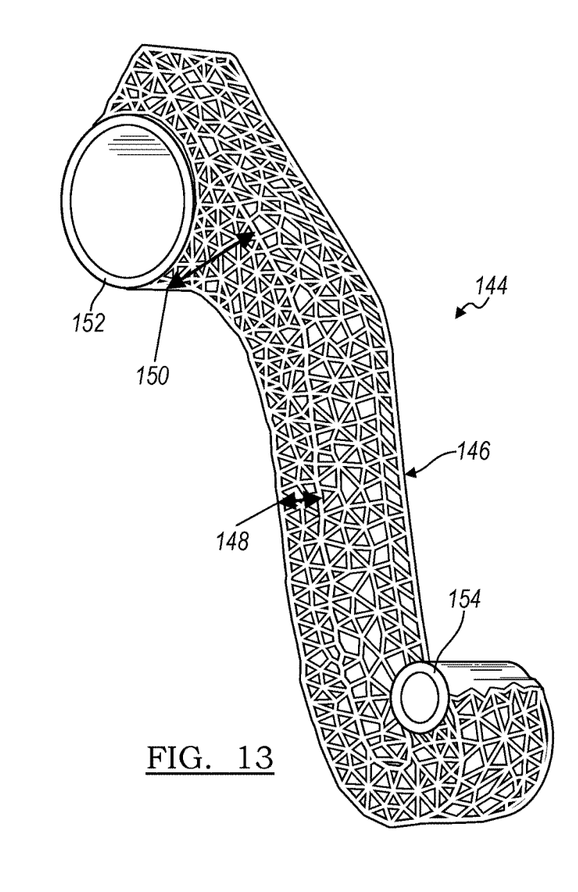
FIG. 13 is a top perspective view of an exemplary lattice structure member manufactured using the wire based additive manufacturing system of FIG. 1.

Referring to FIG. 13, an exemplary structural member 144 made using the wire based additive manufacturing system 10 of the present disclosure is presented. The structural member 144 can have a complex shape such as a curved body 146 which includes different body widths. For example, a first body width 148 near a center of the structural member 144 can be narrower than a second body width 150 proximate to a member end. Additional, non-wire based objects can also be incorporated, for example by a subsequent joining process. For example, a first bush 152 can be connected at a first end of the structural member 144, and a second bush 154 can be connected at a second end. The first and second bushes 152, 154 can be attached for example by a brazing operation. The first and second bushes 152, 154 can also replaced by bosses having a bolt hole therethrough.

Figure 14:
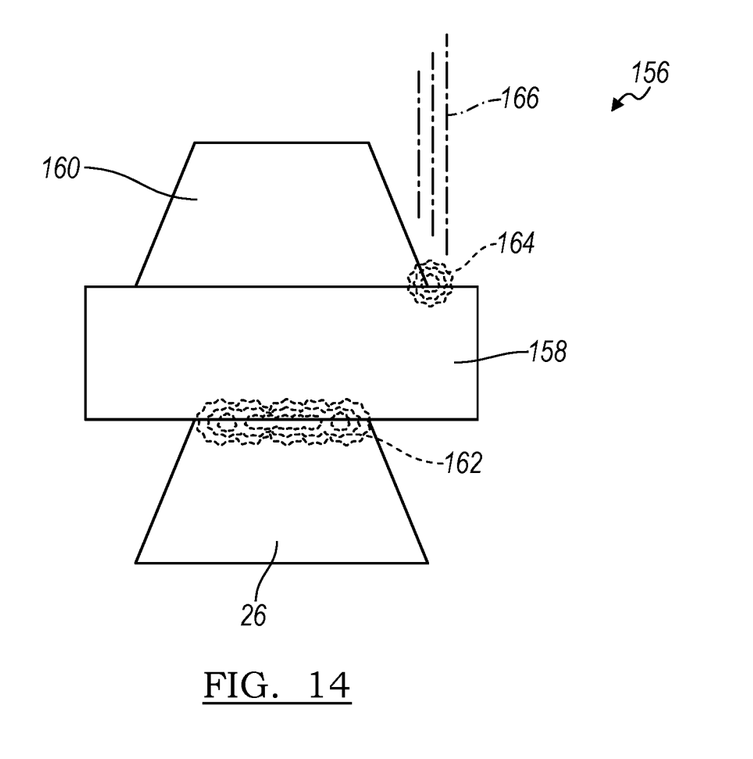
FIG. 14 is an end elevational view of a vertical lattice structure wire additive member made using the wire based additive manufacturing system of FIG. 1 modified to permit welding of single vertically stacked wires.

Referring to FIG. 14 and again to FIGS. 1 through 6, an exemplary configuration of a vertical lattice structure 156 demonstrates how individual strands of wire 26, 158 and 160 can be vertically assembled and welded. Such vertical lattice structures are composed of a stack of short wire strands, whose height is limited to avoid bending of the structure due to the vertical load imposed by the wire guide 32. Welding of the wire 26 to the wire 158 can be performed as previously noted in reference to FIG. 6, using a fillet weld 162. Welding performed when only a single wire is being welded to a single underlying wire such as when welding the wire 160 to the underlying wire 158 can be modified to apply a vertical laser beam 166 modified from the laser welding beam 44 to apply a different pulse train which promotes melting of the upper wire 160 without overheating the lower or underlying wire 158.

Regularly spaced embossed dots or painted marks on the top or bottom surface of the feed wires can be included, which would be detected for example by optical sensors and used to accurately and reliably determine a position of the ends of the feed wires. Without such embossments or marks, the position of the ends of the feed wires could be determined by tracking an angle of rotation of the feed motors which would not account for any slip of feed wires in the feed motor pulleys.

In order to maintain the feed wire in a slacked condition two wire feed motor stages can also be used. For example, a primary wire feed motor stage consists of high torque motors that would be used to pull feed wire from the spools, and a secondary stage consists of low torque motors that control the position of the ends of the feed wires. The torque difference between the primary and the secondary stages allows the section of feed wire positioned between the primary stage and the secondary stage to thereby be maintained in a slightly slacked condition. Use of higher torque feed motors further allows the use of large spools of wire which also provides the benefit of increasing a replacement interval of the spools.

Lasers used for laser welding for the present disclosure can be for example light-emitting diode (LED) lasers. Lasers used for laser cutting for the present disclosure can be for example sublimation lasers. Other types of lasers can also be used or substituted within the scope of the present disclosure.

A wire based additive manufacturing system 10 of the present disclosure offers several advantages. These include the capability to simultaneously weld multiple wires of an additive wire layer, and the inclusion of a trapezoidal-shape in the wires providing a channel between individual wires to reduce weight and permit fillet welding of the adjoining wires. Welding and cutting operations can be conducted using lasers that are fixed with respect to a moving base which makes laser operation repeatable and accurate. Fixing a wire guide and a plurality of wire feed stepper motors with respect to the moving base improves accuracy of wire placement and wire tensioning. Wire can also be fed as a continuous strand from a spool, with a spool size being the only limitation.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A wire based additive manufacturing system, comprising:
   a base movable in a feed direction;
   at least one welding laser;
   at least a first cutting laser and a second cutting laser;
   at least a first wire feed member feeding a first wire onto the base as the base moves in the feed direction; and
   at least a second wire feed member feeding a second wire onto the base and parallel to the first wire as the base moves in the feed direction;
   wherein the at least one welding laser is energized to fuse the first wire to the second wire, the first cutting laser is energized to cut the first wire and the second cutting laser is energized to cut the second wire to complete a wire layer.

2. The wire based additive manufacturing system of claim 1, wherein the at least one welding laser and the at least first and second cutting lasers are spatially fixed as the base moves in the feed direction.

3. The wire based additive manufacturing system of claim 1, further including:
   a first mirror redirecting a laser welding beam from the at least one welding laser to the first wire and the second wire; and
   a second mirror redirecting a laser cutting beam from each of the at least first and second cutting lasers to one of the first wire or the second wire.

4. The wire based additive manufacturing system of claim 1, further including a wire guide slidably receiving each of the first wire and the second wire and oriented to direct the first wire and the second wire toward the at least one welding laser.

5. The wire based additive manufacturing system of claim 4, wherein the wire guide is spatially fixed as the base moves in the feed direction.

6. The wire based additive manufacturing system of claim 4, further including a plurality of flexible depressor fingers extending from the wire guide acting to bias the first wire and the second wire toward the base.

7. The wire based additive manufacturing system of claim 1, further including a next wire from the first wire feed member and a next wire from the second wire feed member added to create a next successive wire layer above the wire layer after completion of the wire layer.

8. The wire based additive manufacturing system of claim 7, wherein the next wire from the first wire feed member and the next wire from the second wire feed member are oriented orthogonally to the first wire and the second wire.

9. The wire based additive manufacturing system of claim 1, wherein each of the first wire and the second wire have opposed angular faces, one of the angular faces of the first wire and one of the angular faces of the second wire facing each other at an intersection between the first wire and the second wire, and further including a weld created at the intersection using the at least one welding laser joining the first wire to the second wire.

10. The wire based additive manufacturing system of claim 9, further including a wire guide having multiple apertures each sized to slidably receive one of the first wire or the second wire, each of the multiple apertures communicating with a slot created in the wire guide oriented to direct the first wire and the second wire toward the at least one welding laser.

11. A wire based additive manufacturing system, comprising:
    a base movable in a feed direction;
    multiple welding lasers each spatially fixed as the base moves in the feed direction;
    multiple cutting lasers each spatially fixed as the base moves in the feed direction; and
    multiple wire feed members each feeding an individual wire of a plurality of wires onto the base as the base moves in the feed direction;
    wherein each one the multiple welding lasers is energized to fuse parallel adjoining ones of the plurality of wires, and each one of the cutting lasers is energized to cut one of the fused wires to complete one of a plurality of wire layers.

12. The wire based additive manufacturing system of claim 11, wherein each of the multiple wire feed members include:
    a stepper motor; and
    a guide roller.

13. The wire based additive manufacturing system of claim 12, wherein each stepper motor is operated at a feed rate less than a rate of displacement of the base in the feed direction to create a reverse tension force in the plurality of wires.

14. The wire based additive manufacturing system of claim 12, wherein successive ones of the stepper motors are staggered in height above a surface of the base.

15. The wire based additive manufacturing system of claim 11, wherein the multiple welding lasers and the multiple cutting lasers are coupled to define a laser welding assembly.

16. The wire based additive manufacturing system of claim 11, further including:
    first and second angular side faces of each of the plurality of wires; and
    a longitudinal channel between successive wire layers positioned between the first angular side face of individual parallel adjoining ones of the plurality of wires.

17. The wire based additive manufacturing system of claim 11, further including a gap created using one of the multiple cutting lasers operating for a time period as the wire additive member is displaced in a feed direction, a width of the gap dependent on a time of operation of the one of the multiple cutting lasers multiplied by a rate of displacement of the wire additive member with the base.

18. A method for operating a wire based additive manufacturing system, comprising:
    moving a base in a feed direction;
    spatially fixing multiple welding lasers and multiple cutting lasers as a welding assembly with respect to the base as the base moves in the feed direction;
    operating multiple wire feed members to feed individual wires of a plurality of wires onto the base as the base moves in the feed direction;
    energizing each one the multiple welding lasers to fuse parallel adjoining ones of the plurality of wires; and
    energizing each one of the cutting lasers to cut one of the fused wires to complete one of a plurality of wire layers.

19. The method for operating a wire based additive manufacturing system of claim 18, further including after each of the parallel adjoining ones of the plurality of wires are fused together and each of the plurality of wires is cut to complete one of the plurality of wire layers:
  lowering the base; and
  rotating the base approximately 90 degrees to position the base to receive a next wire from each of the multiple wire feed members to create a next wire layer above the one of the plurality of wire layers.

20. The method for operating a wire based additive manufacturing system of claim 18, further including creating at least one vertical column connecting two of the plurality of wire layers.

\* \* \* \* \*